US006827392B2

(12) United States Patent
Doncov et al.

(10) Patent No.: US 6,827,392 B2
(45) Date of Patent: Dec. 7, 2004

(54) AUTOMOTIVE VEHICLE WITH OPEN AIR SYSTEM

(75) Inventors: Stephen Doncov, Trenton, MI (US); Christopher J. Dilluvio, Farmington Hills, MI (US); Donald R. Monroe, Dearborn, MI (US); Jeffrey J. Murtfeldt, Redford, MI (US)

(73) Assignee: ASC Incorporated, Southgate, MI (US)

(*) Notice: Subject to any disclaimer, the term of this patent is extended or adjusted under 35 U.S.C. 154(b) by 0 days.

(21) Appl. No.: 10/721,960

(22) Filed: Nov. 25, 2003

(65) Prior Publication Data

US 2004/0104605 A1 Jun. 3, 2004

Related U.S. Application Data

(63) Continuation of application No. PCT/US02/16683, filed on May 28, 2002.
(60) Provisional application No. 60/294,168, filed on May 29, 2001.

(51) Int. Cl.[7] .................................................. B60J 7/00
(52) U.S. Cl. ............ 296/147; 296/146.14; 296/216.04; 296/107.2; 296/213
(58) Field of Search ............ 296/107.07, 107.18–107.2, 296/146.14, 147, 220.01

(56) References Cited

U.S. PATENT DOCUMENTS

| | | | |
|---|---|---|---|
| 2,215,363 | A | 9/1940 | Ruppel et al. |
| 2,436,728 | A | 2/1948 | Parsons |
| 2,596,355 | A | 5/1952 | Ackermans |
| 2,704,225 | A | 3/1955 | Anschuetz et al. |
| 2,714,035 | A | 7/1955 | Limberg et al. |
| 2,747,921 | A | 5/1956 | Hooverson et al. |
| 2,747,923 | A | 5/1956 | McLean |
| 2,762,648 | A | 9/1956 | Huzzard |
| 2,782,070 | A | 2/1957 | Chaban |
| 2,785,922 | A | 3/1957 | Chika |
| 2,836,457 | A | 5/1958 | Beerman et al. |
| 2,957,725 | A | 10/1960 | Ford, II et al. |
| 3,332,169 | A | 7/1967 | Lohr et al. |
| 3,333,362 | A | 8/1967 | Kostin et al. |
| 3,347,592 | A | 10/1967 | Renneker |
| 3,357,738 | A | 12/1967 | Bourlier |
| 3,823,977 | A | 7/1974 | Fioravanti |
| 4,543,747 | A | 10/1985 | Kaltz et al. |
| 4,852,935 | A | 8/1989 | Varner |
| 4,854,634 | A | 8/1989 | Shiraishi et al. |
| 5,018,783 | A | 5/1991 | Chamings et al. |
| 5,029,937 | A | 7/1991 | Yamamoto |
| 5,078,447 | A | 1/1992 | Klein et al. |
| 5,090,764 | A | 2/1992 | Kogawa et al. |
| 5,103,382 | A | 4/1992 | Kondo et al. |

(List continued on next page.)

FOREIGN PATENT DOCUMENTS

| | | | |
|---|---|---|---|
| DE | 3545870 | * 6/1987 | ............ 296/216.06 |
| DE | 3816060 | 11/1989 | |
| DE | 4320492 | 10/1994 | |

(List continued on next page.)

OTHER PUBLICATIONS

Terracross brochure, Jan. 2001, North American Auto Show, Detroit, Michigan.

*Primary Examiner*—Dennis H. Pedder
(74) *Attorney, Agent, or Firm*—Harness, Dickey & Pierce, P.L.C.

(57) ABSTRACT

An open air system (21) for an automotive vehicle includes a roof panel (23, 25), which can be retracted to a stowed position below a storage compartment cover (29). In another aspect of the present invention, two or more generally rigid roof panels (23, 25) are movable from above a passenger compartment (33) to below a generally horizontal plane (261). A further aspect of the present invention provides a back window (27), which can be raised and lowered.

15 Claims, 18 Drawing Sheets

U.S. PATENT DOCUMENTS

| | | | | | |
|---|---|---|---|---|---|
| 5,119,068 | A | | 6/1992 | Nagai et al. | |
| 5,165,772 | A | | 11/1992 | Wu | |
| 5,197,779 | A | | 3/1993 | Mizuno et al. | |
| 5,209,544 | A | * | 5/1993 | Benedetto et al. ..... | 296/107.18 |
| 5,727,839 | A | | 3/1998 | Ruhringer et al. | |
| 5,746,475 | A | | 5/1998 | Caye et al. | |
| 5,944,378 | A | | 8/1999 | Mather et al. | |
| 5,951,100 | A | | 9/1999 | Ewing et al. | |
| 5,961,177 | A | | 10/1999 | Caye et al. | |
| 5,975,620 | A | | 11/1999 | Jambor et al. | |
| 5,975,820 | A | | 11/1999 | Kirchen | |
| 6,419,308 | B1 | | 7/2002 | Corder et al. | |
| 6,485,094 | B2 | | 11/2002 | Corder et al. | |
| 6,641,202 | B2 | | 11/2003 | Graf et al. | |
| 6,648,397 | B2 | | 11/2003 | Schutt et al. | |
| 6,648,405 | B2 | | 11/2003 | Bunsmann et al. | |
| 6,672,638 | B2 | | 1/2004 | Corder et al. | |
| 6,672,658 | B2 | | 1/2004 | De Gaillard | |

FOREIGN PATENT DOCUMENTS

| | | |
|---|---|---|
| DE | 4443525 | 2/1996 |
| DE | 19756021 | 12/1998 |
| DE | 10025051 | 11/2001 |
| EP | 0992384 | 4/2000 |
| EP | 0999079 | 5/2000 |
| FR | 2744979 | 8/1997 |
| FR | 2797817 | 3/2001 |
| FR | 2818931 | 7/2002 |
| JP | 5024437 | 2/1993 |

* cited by examiner

AUTOMOTIVE VEHICLE WITH OPEN AIR SYSTEM

CROSS-REFERENCE TO RELATED APPLICATIONS

This application is a continuation of PCT/US02/16683, filed May 28, 2002 which claims the benefit of U.S. Provisional Application No. 60/294,168, filed May 29, 2001; the disclosures of which are incorporated herein by reference.

FIELD OF THE INVENTION

The present invention generally relates to automotive vehicles and more specifically to an open air system for an automotive vehicle.

BACKGROUND AND SUMMARY OF THE INVENTION

It is common in the automotive industry to employ fabric covered convertible roofs and hardtop convertible roofs, which are movable from a closed position above a passenger compartment to a retracted position within a bootwell or trunk. It is also known to provide movable tonneau covers to cover the stowed convertible roofs. For example, reference should be made to U.S. Pat. No. 5,090,764 entitled "Vehicle Body Construction for Hardtop Convertible" which issued to Kogawa et al. on Feb. 25, 1992, and German 38 16 060 entitled "Passenger Car having a Two-Part Hardtop" which was published on Nov. 16, 1989. However, most automotive vehicles must be parked and prevented from driving when the convertible roof is moved between the closed and stowed position. Otherwise, the wind created during driving would catch the inside of the convertible roof and tonneau cover when they are pivoted to near-vertical positions thereby potentially damaging the mechanisms. Therefore, many recent vehicles have either employed electric circuits that require the parking brake to be applied or the automatic transmission must be shifted to the park position, before the convertible roof actuators are energized.

It has also become desirable to maximize the open air or open roof space above the passenger compartment. The following U.S. patents disclose various conventional sunroof constructions: U.S. Pat. No. 5,961,177 entitled "Sunroof Assembly Drain Trough for an Automotive Vehicle" which issued to Caye et al. on Oct. 5, 1999; U.S. Pat. No. 5,951,100 entitled "Sunroof Assembly for an Automotive Vehicle" which issued to Ewing et al. on Sep. 14, 1999; U.S. Pat. No. 5,197,779 entitled "Power Sliding Sunroof" which issued to Mizuno et al. on Mar. 30, 1993; U.S. Pat. No. 5,029,937 entitled "Roof System for Vehicle" which issued to Yamamoto on Jul. 9, 1991; and U.S. Pat. No. 5,018,783 entitled "Slidable, Foldable, and Removable Vehicle Sunroof" which issued to Chamings et al. on May 28, 1991. All of these patents are incorporated by reference herein. While many of these prior arrangements have significantly improved the art, however, the open air space can still be further increased while increasing passenger compartment headroom.

Another traditional automotive vehicle has employed a flexible fabric roof which can be closed by manually snapping or otherwise attaching the fabric roof to stationary roof rails and a front header. This fabric roof can also be manually rolled up to expose fully the passenger compartment between the roof rails. Notwithstanding, this conventional approach is time-consuming to close, unsightly, and cannot be easily retracted during vehicle driving and lacks adequate cold weather insulating properties.

In accordance with the present invention, an open air system for an automotive vehicle includes a roof panel, which can be retracted to a stowed position below a storage compartment cover. In another aspect of the present invention, two or more generally rigid roof panels are movable from above a passenger compartment to below a plane defined by a closed rear deck lid. A further aspect of the present invention provides a back window, which can be raised and lowered without necessitating retraction of a movable roof panel. Still another aspect of the present invention employs a pair of stationary side rails, one or more generally rigid roof panels, and a generally rigid back window, which are all movable from passenger compartment covering positions to stowed positions beneath a tonneau cover. In a further aspect of the present invention, a tonneau cover mechanism employs links and a slide. Another aspect of the present invention provides a locking system for a slidable panel. A four-bar linkage mechanism is used for a slidable panel in yet another aspect of the present invention. Additionally, a further aspect of the present invention provides an integrated tonneau cover and open air sealing arrangement.

The open air roof system of the present invention is advantageous over conventional devices in that the present invention allows for easy retraction and closure of a convertible roof with a rigid tonneau cover. The use of stationary side rails for the present invention also enhances vehicle structural integrity when the roof panels are stowed while also serving as a sturdy platform to mount elongated tracks, the corresponding roof panel driving mechanisms and the weatherstrip seal. The roof system of the present invention also advantageously allows independent venting and partial retracted opening of the front roof panel regardless of whether the back window is closed or stowed. The back window can also be opened without requiring concurrent movement of the front or rear roof panels. The sealing arrangement of the present invention is advantageous over conventional constructions since the present invention uses a single-piece seal along the entire roof and tonneau cover opening; this minimizes leakage-prone joints and reduces part count inventory. The linkage mechanisms for the slidable panels and the tonneau cover advantageously allow for engagement and disengagement from the adjacent sealing segments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
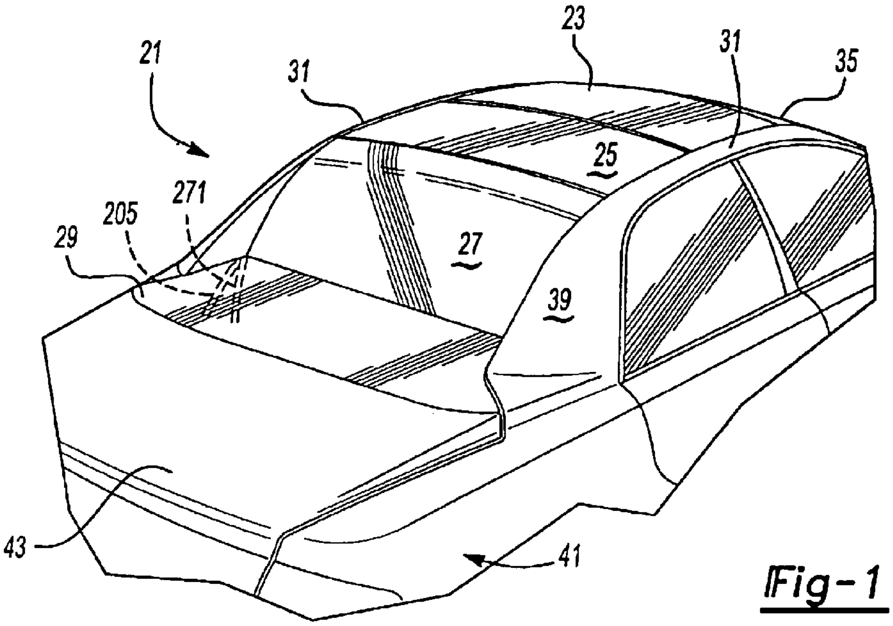
FIG. 1 is a fragmentary perspective view illustrating the preferred embodiment of the open air system of the present invention with a front roof panel, mid roof panel, back window and tonneau cover all located in their respective closed positions.
Figure 2:
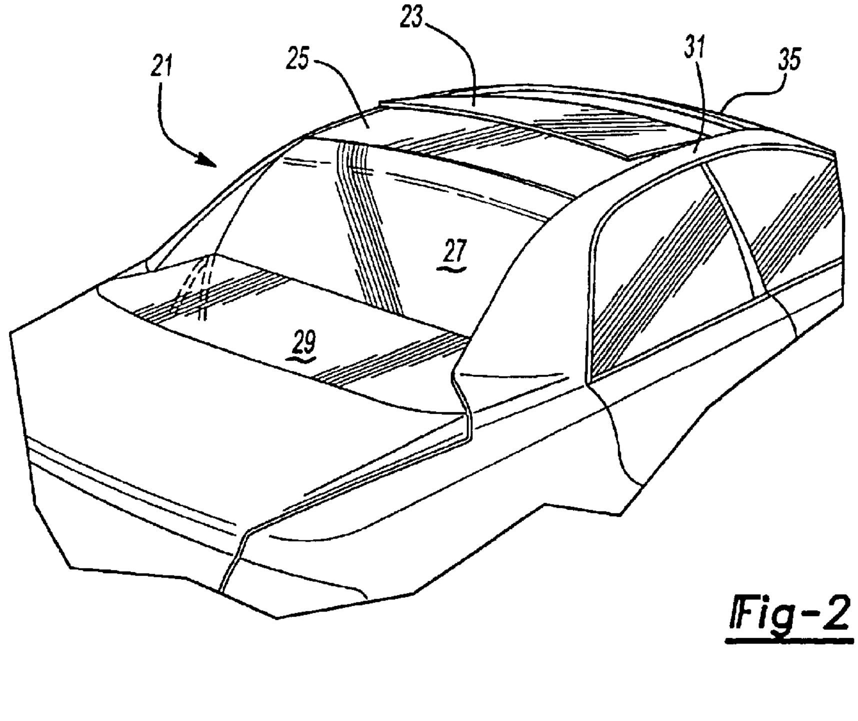
FIG. 2 is a fragmentary perspective view illustrating the preferred embodiment open air system of FIG. 1 with the front roof panel disposed in a partially open spoiler position.
Figure 3:
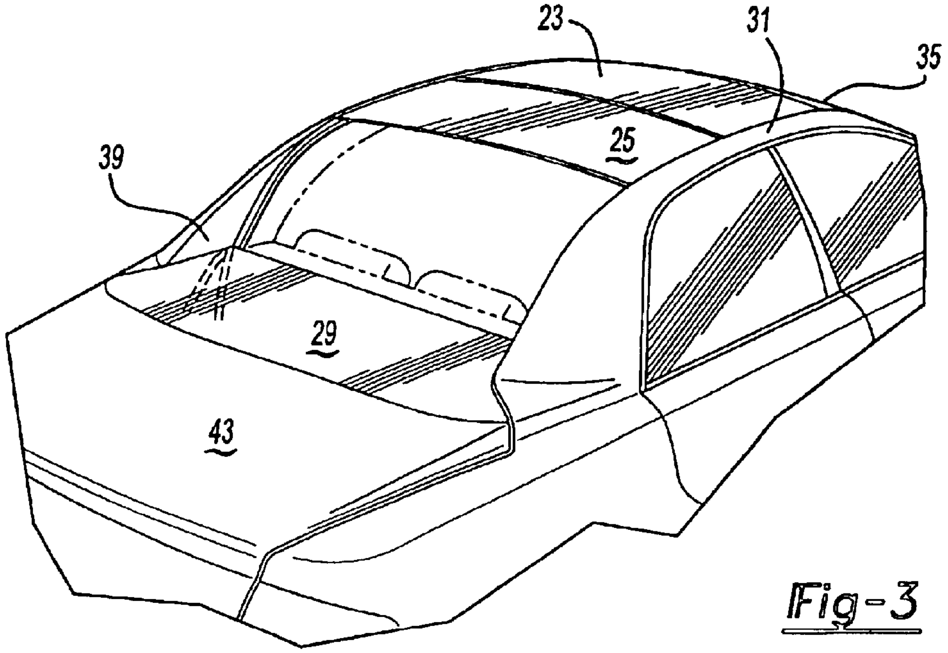
FIG. 3 is a fragmentary perspective view illustrating the preferred embodiment open air system of FIG. 1 with the back window disposed in its open and stowed position.
Figure 4:
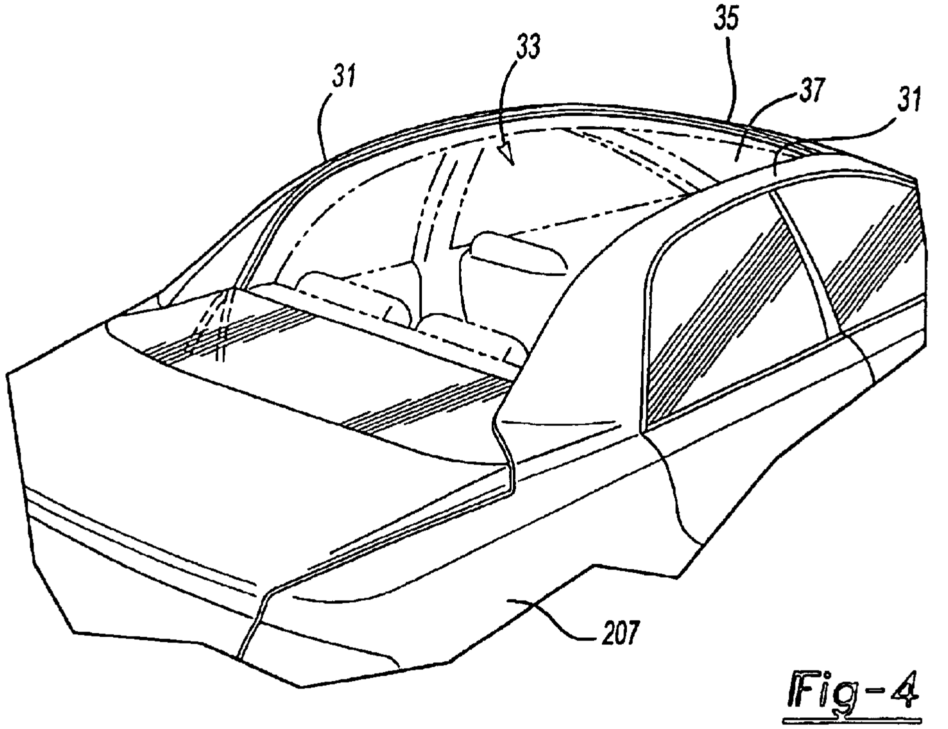
FIG. 4 is a fragmentary perspective view illustrating the preferred embodiment open air system of FIG. 1 with the front roof panel, mid roof panel and back window all retracted to their open and stowed positions below the tonneau cover.

The following description of the preferred embodiment is merely exemplary in nature and is in no way intended to limit the invention, its application, or uses.

With particular reference to FIGS. 1–6, the preferred embodiment of an open air system 21 according to the principles of the present invention is illustrated having a front roof panel 23, a mid roof panel 25, a back window or backlite 27, and a tonneau cover 29. Front roof panel 23, mid roof panel 25 and back window 27 all span in a crosscar direction between a pair of stationary side roof rails 31 above a passenger compartment 33. A front header 35 serves to connect structurally together side roof rails 31 adjacent to a front windshield 37. Side roof rails 31 rearwardly transition into enlarged C-pillars 39, which are also known as, quarter upper panels or sail panels. Tonneau cover 29 spans in a crosscar manner between C-pillars 39. A roof storage compartment 209 is covered by tonneau cover 29. Furthermore, a trunk compartment 41 is covered by a pivotable trunk or deck lid 43. Deck lid 43 is disposed behind and generally parallel with the horizontally closed tonneau cover 29. Front roof panel 23 and mid roof panel 25 each include outer and inner sub-panels, preferably stamped from aluminum or steel sheet that are attached together.

As best seen in FIGS. 5–14, a front drive mechanism 451 for front roof panel 23 is provided. A roof panel track 271 is mounted to each side rail 31. Roof panel track 271 is preferably extruded from aluminum and is elongated in a generally fore-and-aft direction extending from front header 35 (FIGS. 1–6) to the bottom of roof storage compartment 209. A front carrier 273 has feet 453 extending in a lateral crosscar direction that engage undercut grooves 272 of roof panel track 271. Front and rear camming slots 279 and 280, respectively, are located in front carrier 273. A first camming pin 455 transversely projects from a bracket 457 for engagably following along front camming slot 279. Similarly, a second camming pin 459 transversely projects from bracket 457 for engagably following along camming slot 280. A third camming pin 471 extending from an opposite face of bracket 457 engagably follows a camming slot 473 of a drive block 475. Bracket 457 is adhesively bonded, encapsulated, or otherwise fastened to an interior surface of front roof panel 23.

Figure 10:
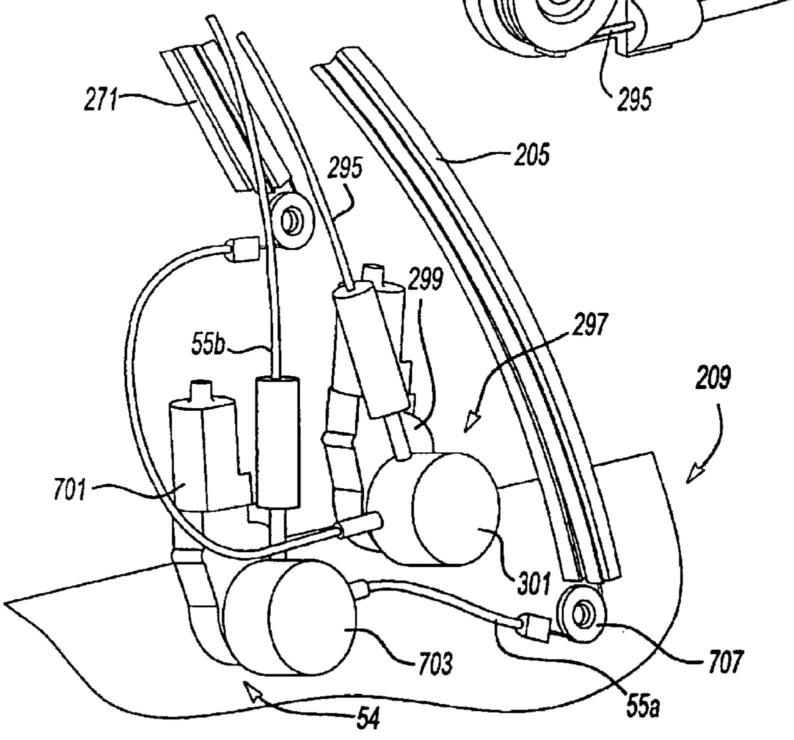
FIG. 10 is a fragmentary and enlarged perspective view illustrating the bottom and rear portions of the primary and supplemental tracks as well as the actuators, employed in the preferred embodiment open air system.
Figure 11:
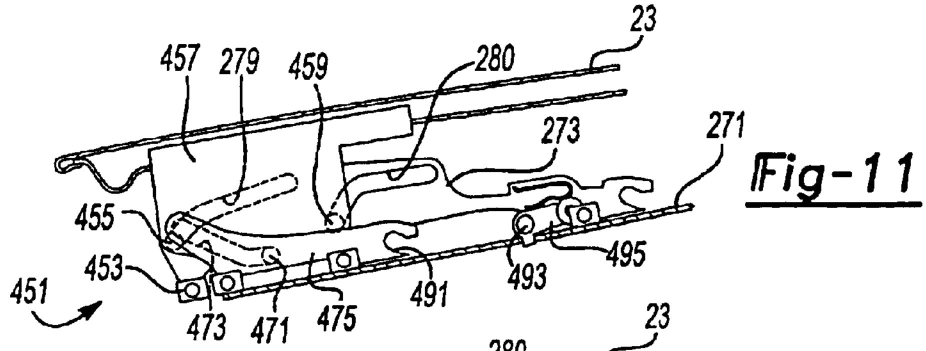
FIGS. 11–15 are a sequential series of diagrammatic side views illustrating the front sunroof panel mechanism employed in the preferred embodiment open air system.
Figure 12:
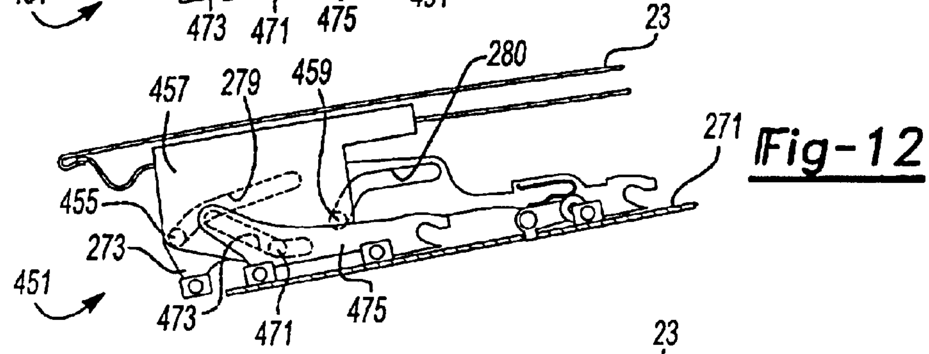
Figure 13:
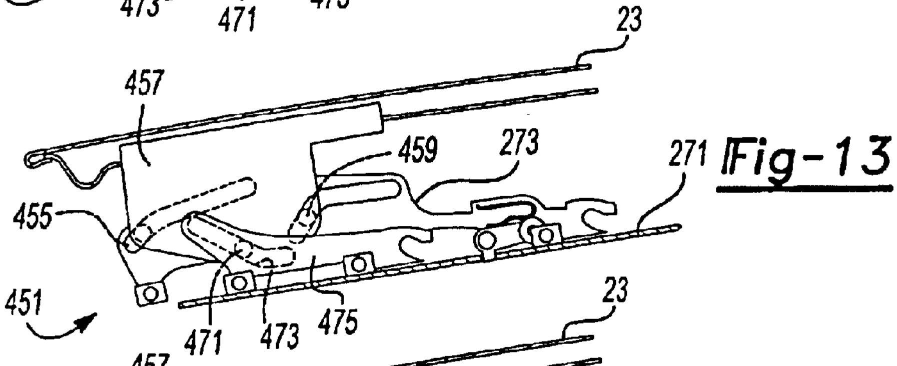
Figure 14:
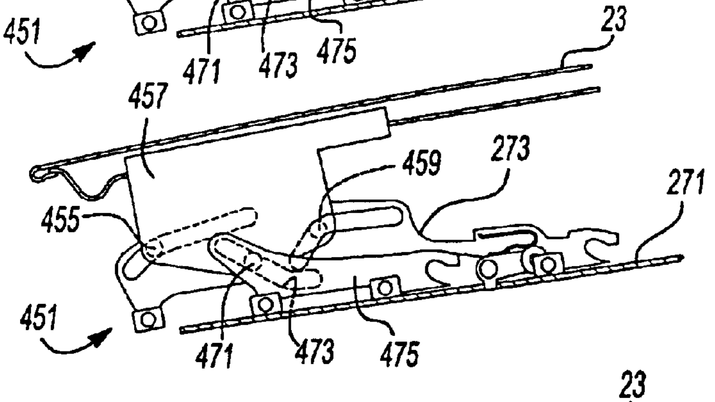

An inexpensive, flexible, and elongated roof panels drive cable 295 is positioned above and external to roof panel track 271 and has an eyelet 481 (see FIG. 9) which is fastened to drive block 475. This allows a less complicated and less expensive extruded track to be used without a circular passage for internally accepting the cable. Accordingly, with particular reference to FIGS. 11–15, when a first electric motor actuator 297 (FIG. 10) rearwardly pulls roof panels drive cable 295 on top of roof panel track 271, drive block 475 will move relative to roof panel track 271 and front header 35. The first electric motor actuator 297 includes a fractional horsepower, direct current, electromagnetic motor 299 and a rotary cable drum 301 (FIG. 10). The electronic control unit will act in response to a vehicle operator switch and will thus energize first electric motor actuator 297 for either a predetermined time or until a hall-effect or similar encoder indicates the desired position of drive block 475. Drive block 475 is retracted rearwardly in an initial lost motion manner wherein a fourth camming pin 483 rotates a pull down actuator 485. This causes a pull down rod 487, coupled between a cage and a pivot of pull down actuator 485, to move linearly rearward. Next, pull down rod movement rearwardly rotates a rear pull down lock 489, which in turn, disengages from a pull down pin 490 stationarily secured to roof panel track 271.

Figure 5:
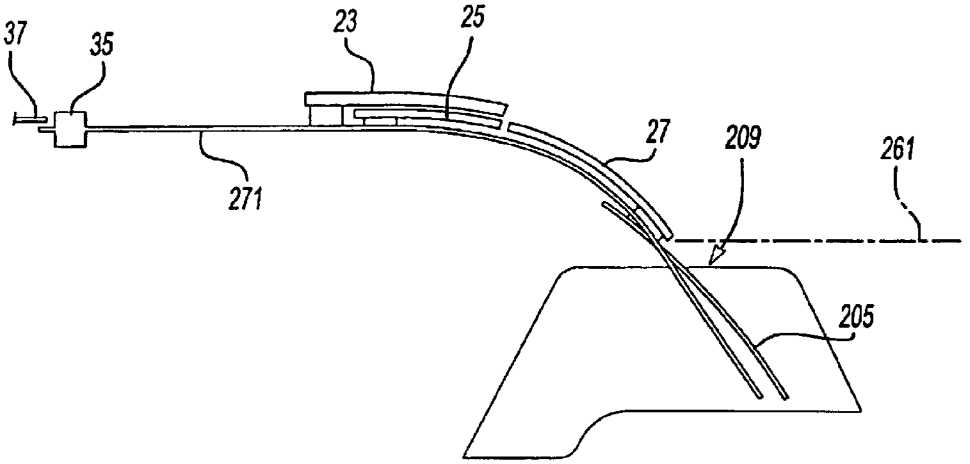
FIG. 5 is a diagrammatic side view illustrating the preferred embodiment open air system with the front roof panel disposed in its intermediate open spoiler position.
Figure 6:
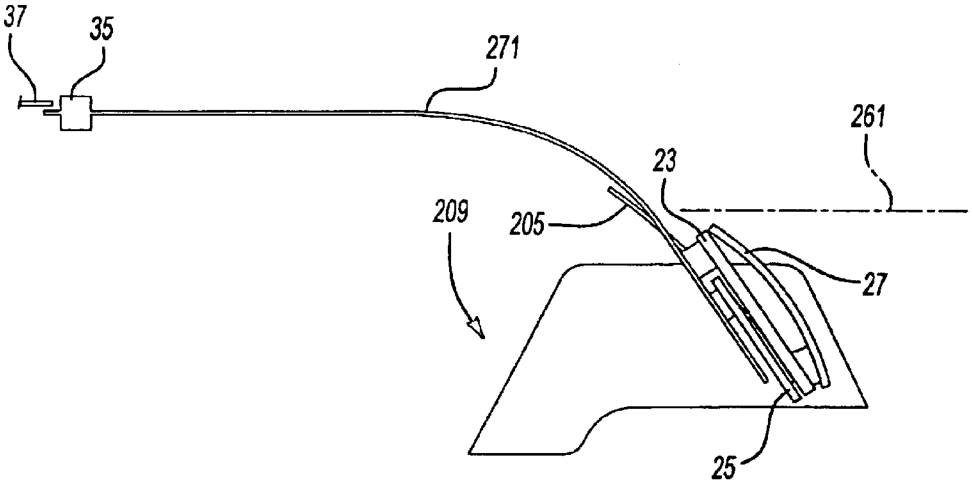
FIG. 6 is a diagrammatic side view illustrating the preferred embodiment open air system with front roof panel, mid roof panel, and back window retracted to their open and stowed positions below the tonneau cover.
Figure 7:
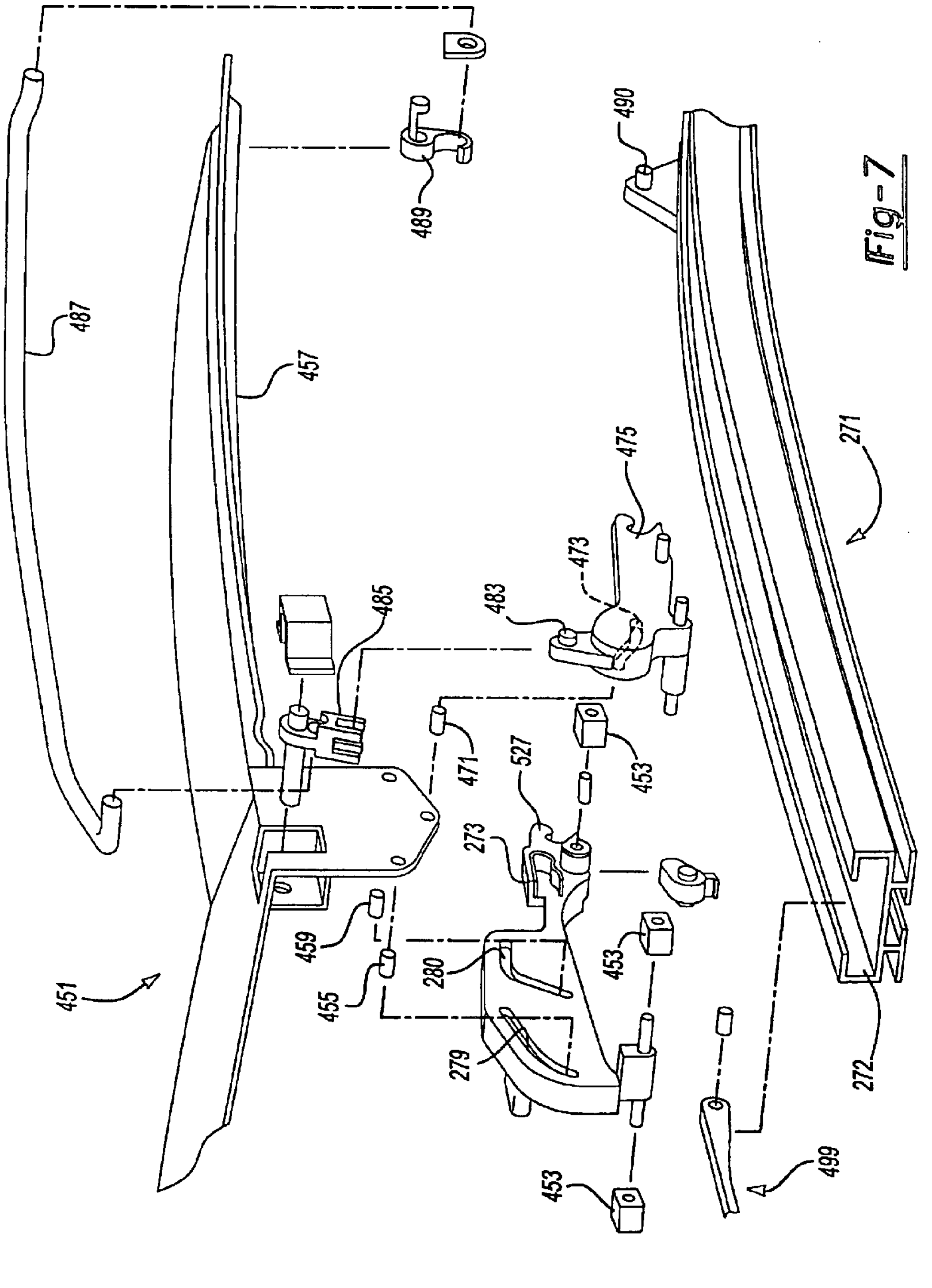
FIG. 7 is an exploded perspective view illustrating a front sunroof panel mechanism employed in the preferred embodiment open air system.
Figure 8:
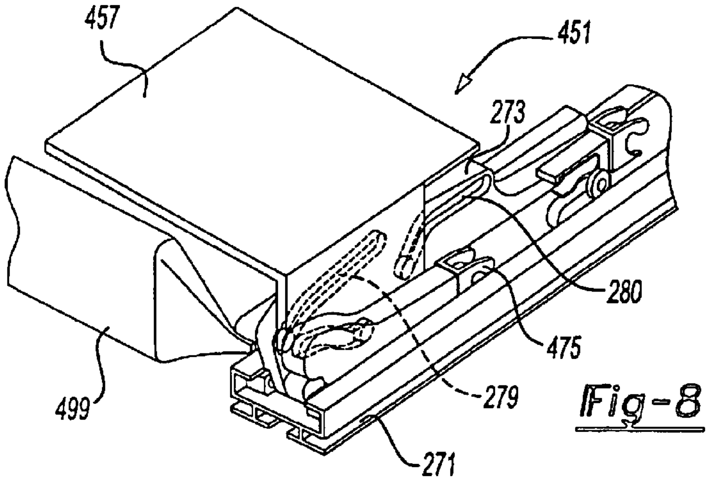
FIG. 8 is a perspective view illustrating the front sunroof panel mechanism disposed in a fully closed and forward most position employed in the preferred embodiment open air system.
Figure 9:
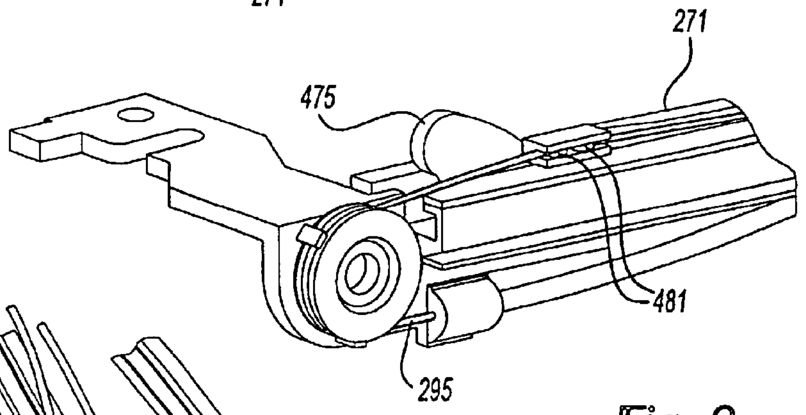
FIG. 9 is a fragmentary and enlarged perspective view illustrating the front portion of the roof panel track employed in the preferred embodiment open air system.
Figure 15:
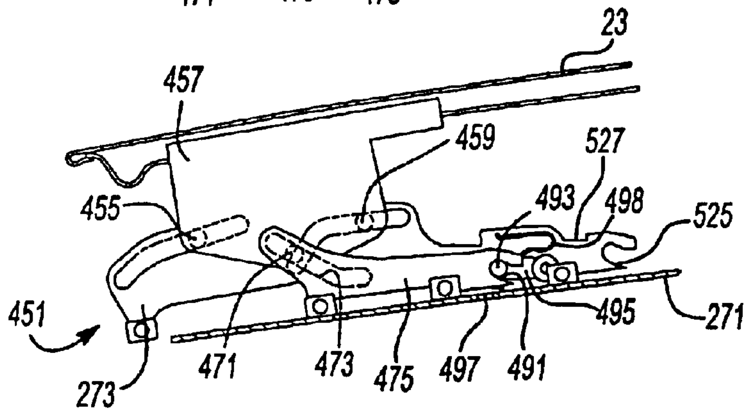

Subsequent retraction of drive block 475 allows camming pins 455, 459 and 471 to slide upwardly in their associated camming slots 279, 280 and 473 thereby vertically lifting front roof panel 23 off of body seal 63 (FIG. 36) and slightly rearward to a spoiler venting position, partially above mid roof panel 25. When the cable subsequently pulls drive block 475 further rearward, a generally C-shaped mouth 491 of drive block 475 engages and upwardly cams a pin 493 of a front roof locking shoe 495 (FIG. 15). This rotatably releases front roof locking shoe 495 from an aperture 497 in a bottom surface of roof panel track 271, against a spring 498. Subsequently, the entire vented front roof panel 23 is retracted above a plane of the otherwise stationary mid roof panel 25 in an overlapping spoiler-type arrangement as shown in FIG. 5.

Venting movement of front roof panel 23 allows extension of an elongated arm coupled to a wind deflector 499, due to spring biased actuation. When reversed, carrier downwardly depresses the elongated arm to lower wind deflector 499.

Figure 16:
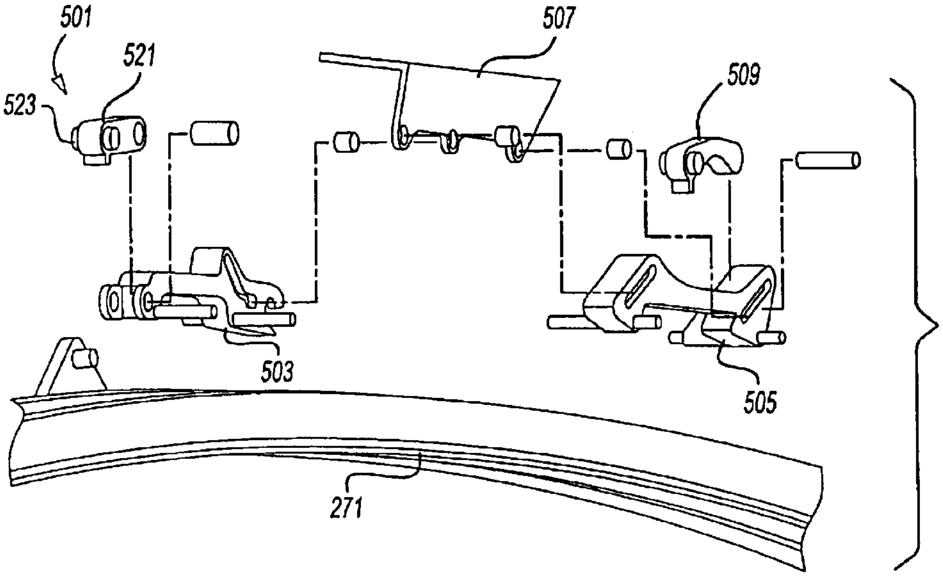
FIG. 16 is an exploded perspective view illustrating the rear sunroof panel mechanism employed in the preferred embodiment open air system.

Referring now to FIG. 16, panel mechanism 501 includes a rear drive block 503, a carrier 505, a bracket 507, and a track-to-carrier locking shoe 509, all operating in a similar manner to those parts for front drive mechanism 451. However, rear drive block 503 is moved by interlocking engagement with front carrier 273.

Figure 17:
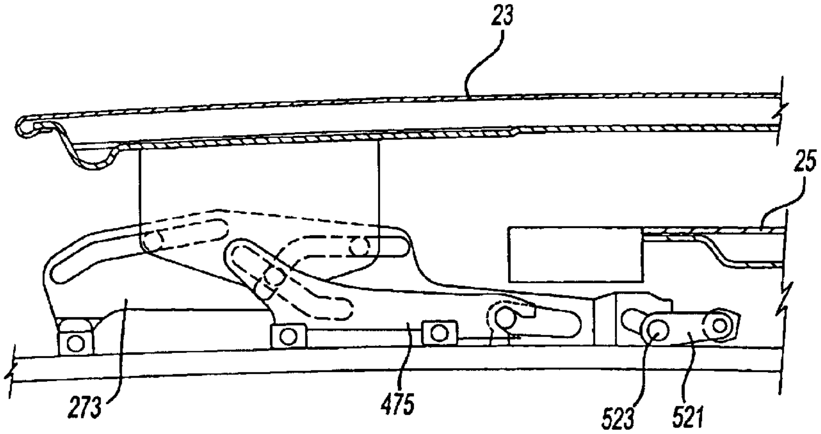
FIG. 17 is a diagrammatic side view illustrating the interface between the front and rear sunroof panel mechanisms employed in the preferred embodiment open air system.
Figure 18:
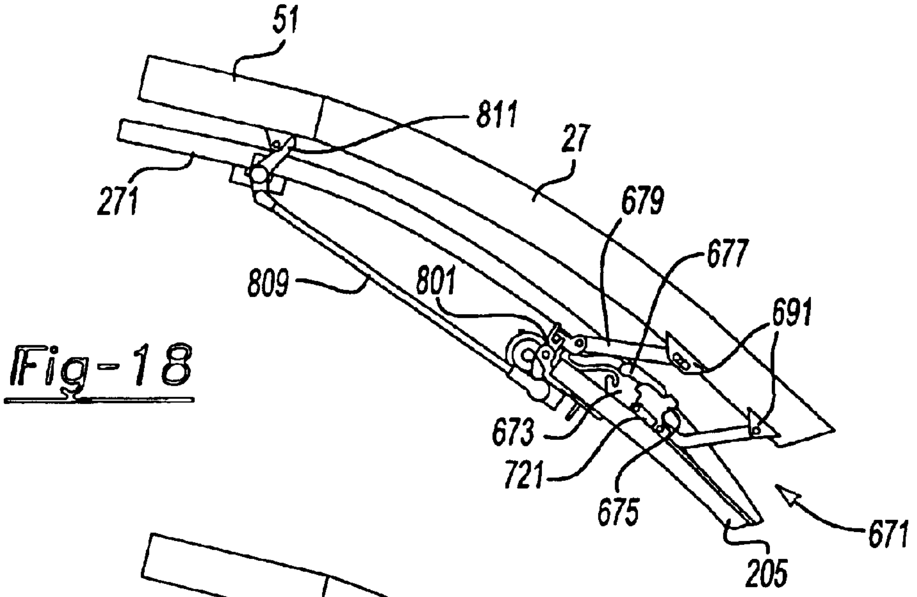
FIGS. 18–21 are a series of side elevational views illustrating the retraction and opening sequence for the back window mechanism employed in the preferred embodiment open air system.

With particular reference to FIGS. 15–17, it can be seen that rearward movement of front carrier 273 causes unlocking of a roof panel carrier lock 521, whereby a generally L-shaped pawl has a foot which is upwardly rotated to disengage from an aperture in the bottom of roof panel track 271. Moreover, a transversely projecting pin 523 of mid roof panel carrier lock 521 upwardly slides into a generally C-shaped mouth 525 of a locking member section 527 of front carrier 273. In an alternate embodiment, the interlocked roof panels can be stopped in any partially opened position between FIGS. 5 and 6. Further rearward sliding movement of front carrier 273 indirectly causes disengagement of track-to-carrier locking shoe 509. Specifically, rearward sliding movement of front carrier 273 causes drive block 503 to travel rearward to disengage track-to-carrier locking shoe 509, which is attached to mid panel 505. Thus, when front roof panel 23 has been moved to its intermediate open spoiler position as shown in FIG. 5, front and mid roof panels 23 and 25, respectively, are securely locked together and will move simultaneously together throughout further retraction into the storage compartment. In the reverse direction, forward advancing movement of the front roof panel will concurrently cause mid roof panel 25 to follow until mid roof panel 25 is in its fully closed position, shown again in FIG. 5. At this point, mid roof panel carrier lock 521 will reengage roof panel track 271 and become disengaged from C-shaped mouth 525 of front carrier 273 upon further advancing and closing movement of front roof panel 23. Thus, a separate electric motor and cable system is not required for mid roof panel 25, thereby reducing cost and simplifying the construction.

Figure 22:
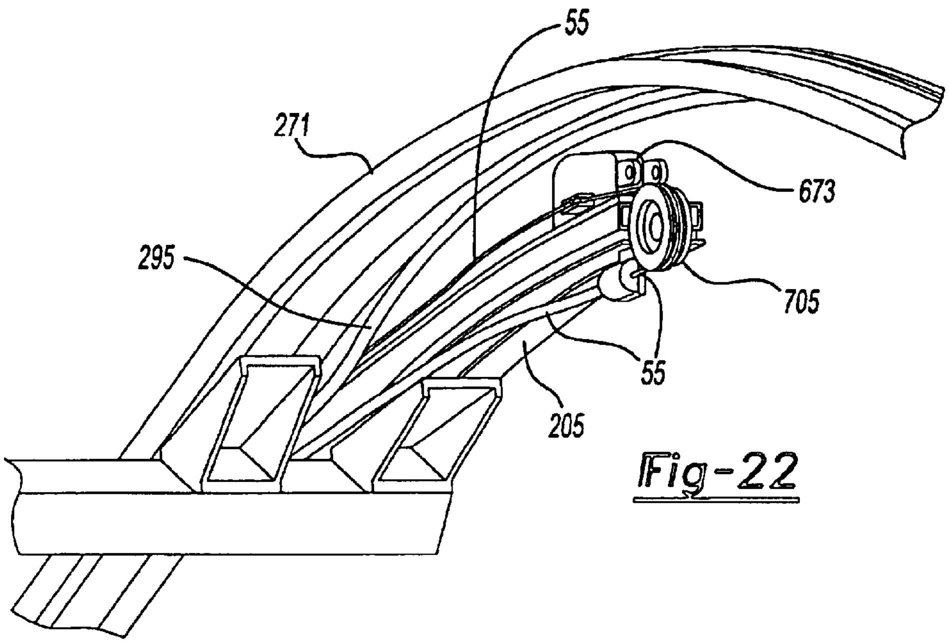
FIG. 22 is a perspective view illustrating the primary and supplemental tracks employed in the preferred embodiment open air system.
Figure 23:
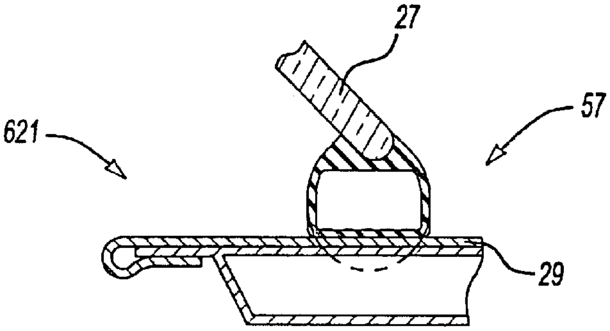
FIG. 23 is a cross sectional centerline view illustrating a seal arrangement between the back window and tonneau cover, both being disposed in their closed positions, employed in the preferred embodiment open air system.
Figure 24:
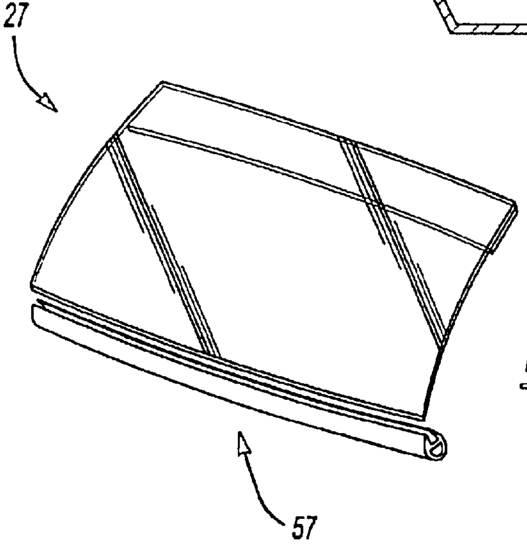
FIG. 24 is exploded perspective view illustrating the sealing arrangement for the back window and tonneau cover employed with the preferred embodiment open air system.
Figure 25:
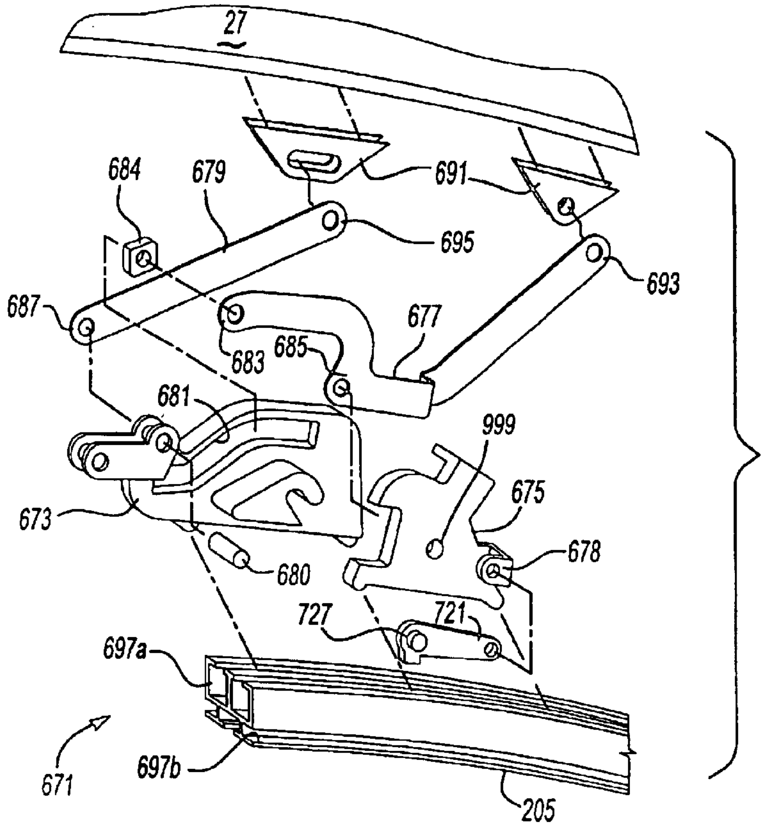
FIG. 25 is an exploded perspective view illustrating a back window mechanism employed in the preferred embodiment open air system.
Figure 26:
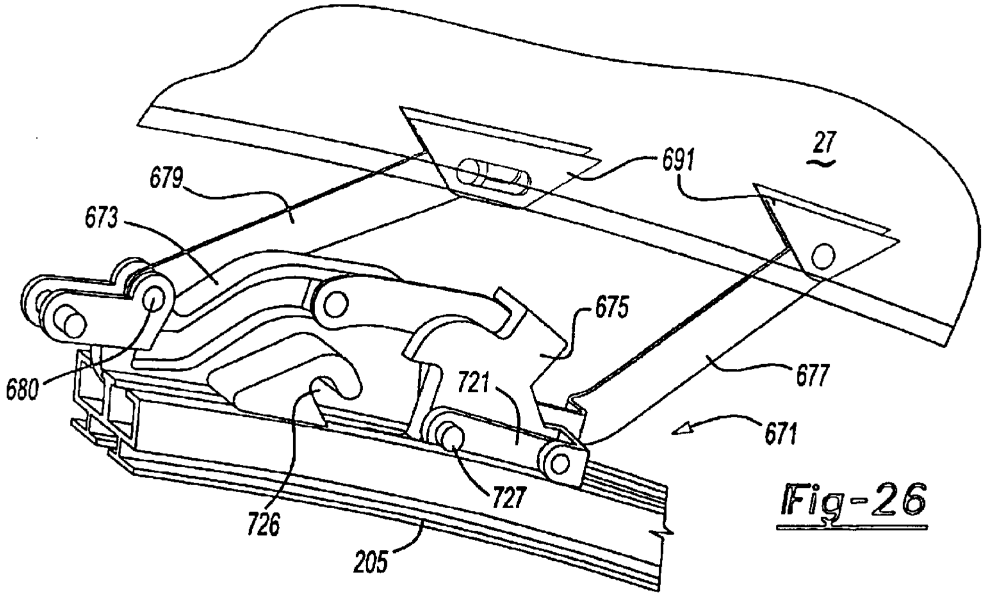
FIGS. 26–28 are perspective views illustrating the back window mechanism employed in the preferred embodiment open air system.
Figure 27:
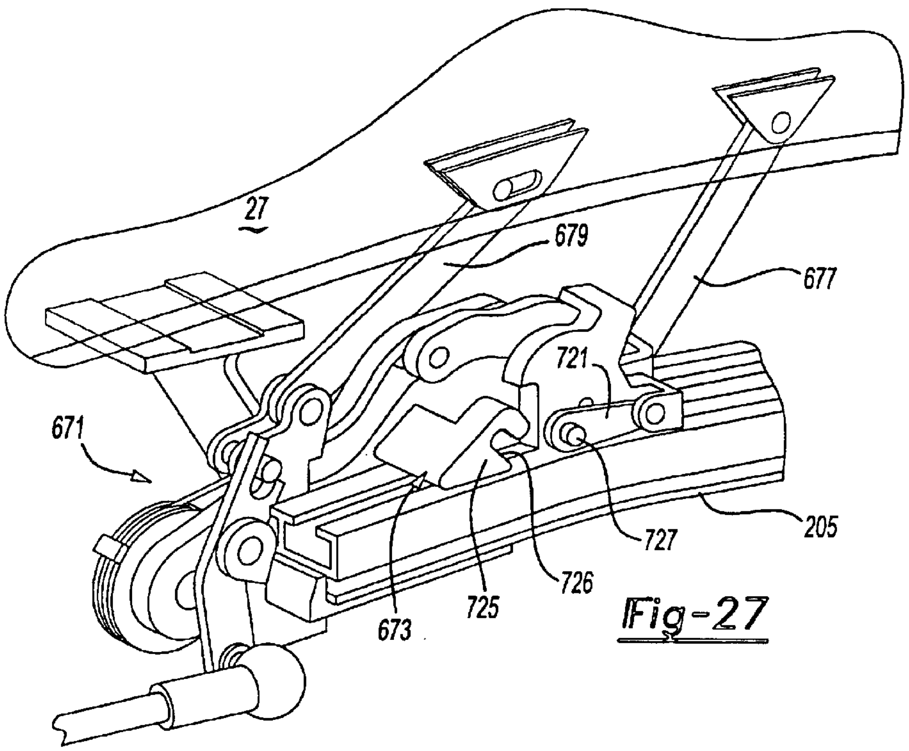
Figure 28:
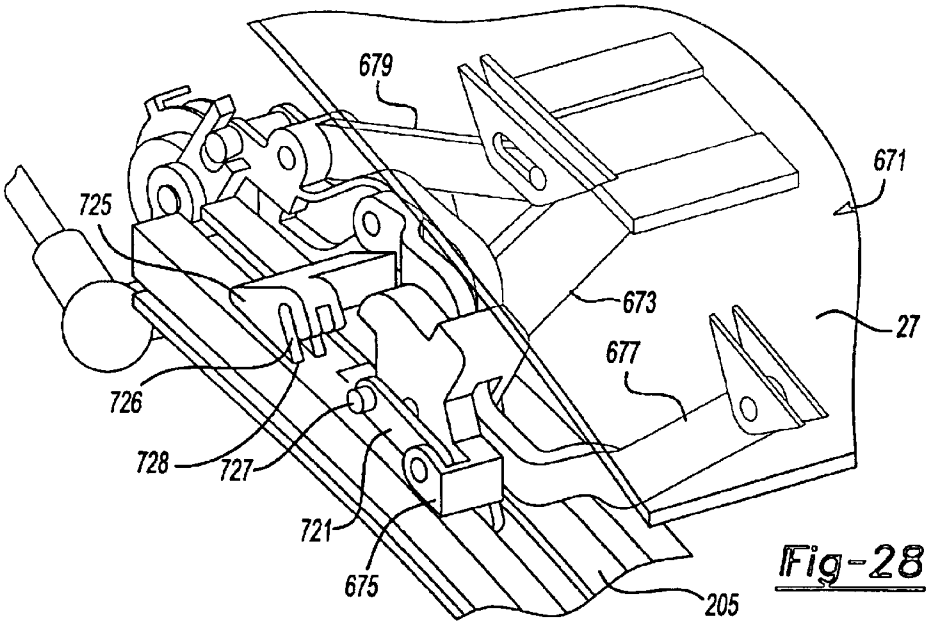
Figure 29:
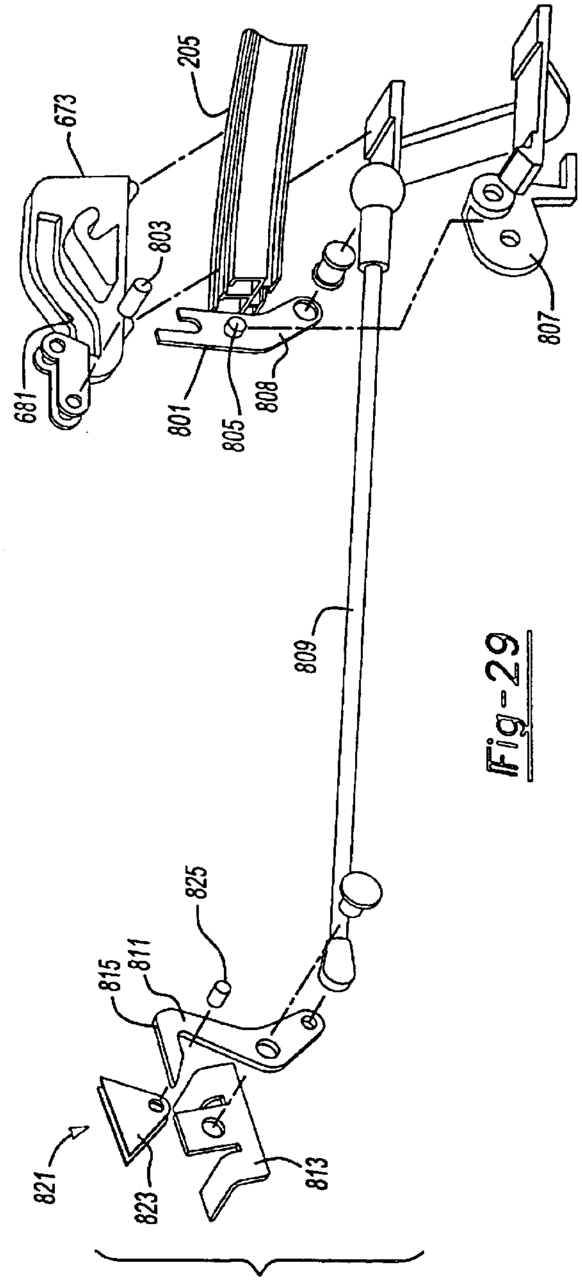
FIGS. 29 and 30 are exploded perspective views illustrating a pull down latching apparatus for the back window employed in the preferred embodiment open air system.
Figure 30:
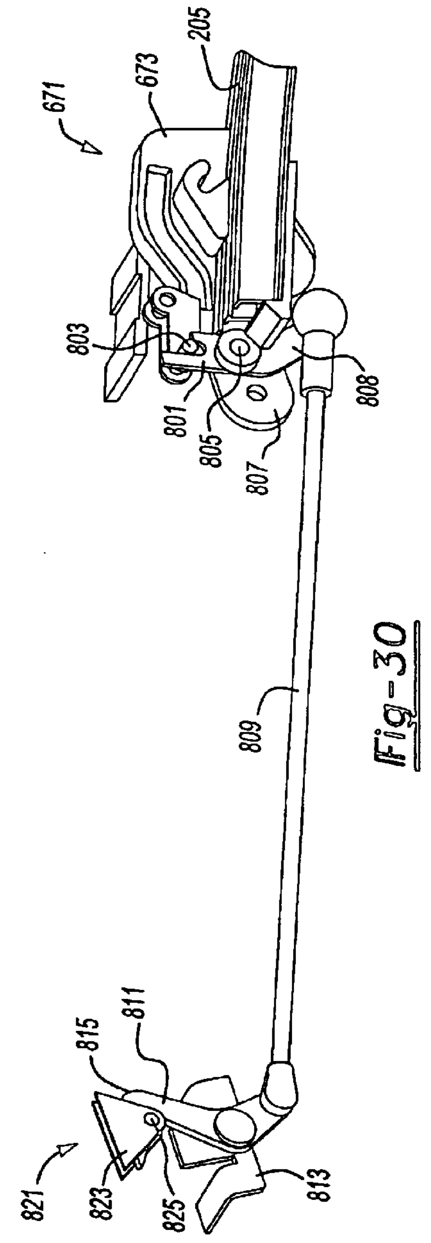
Figure 31:
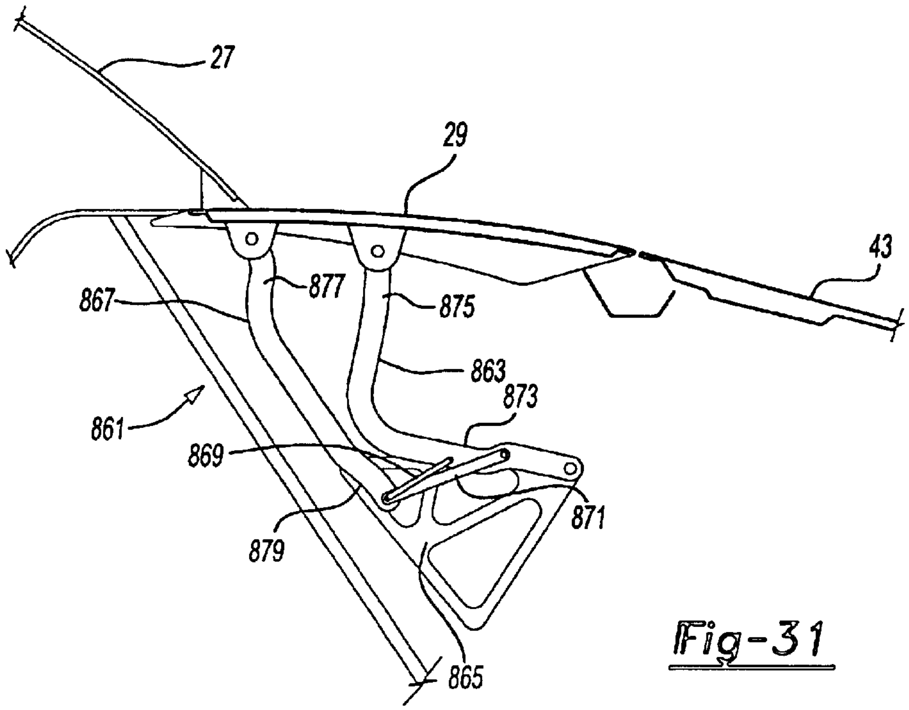
FIGS. 31–34 are a series of diagrammatic side views illustrating opening sequence of movement for a tonneau cover mechanism employed in the preferred embodiment open air system.
Figure 32:
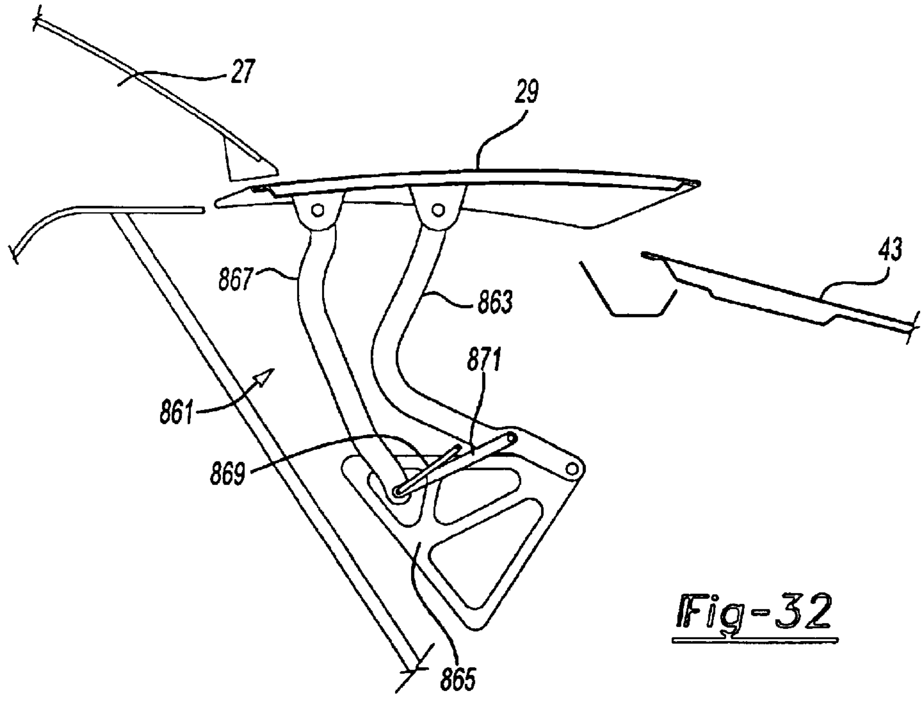
Figure 33:
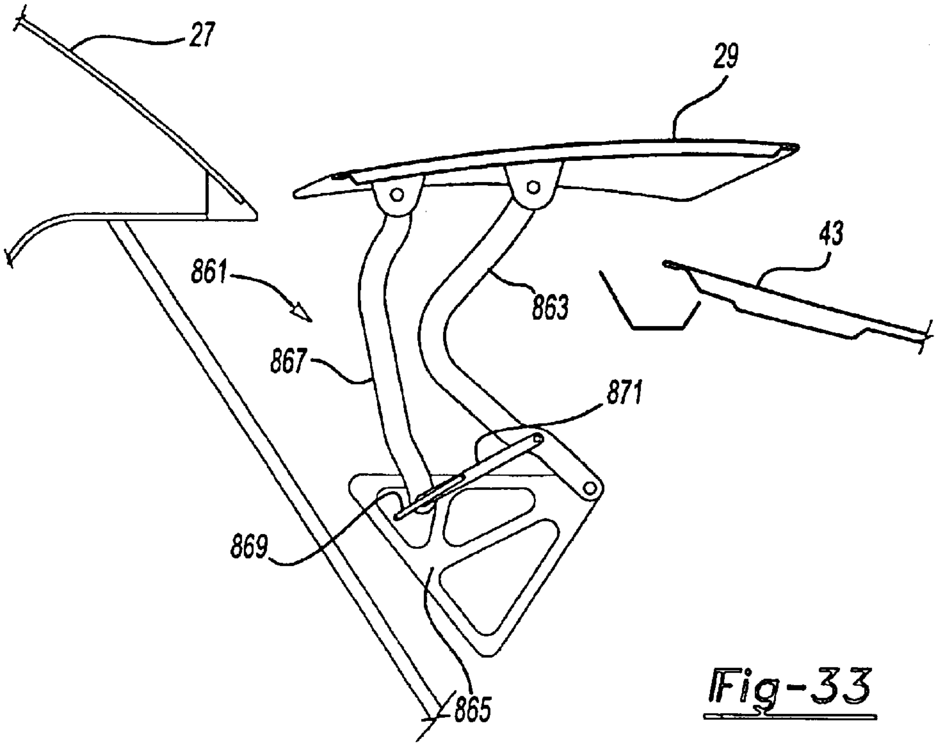
Figure 34:
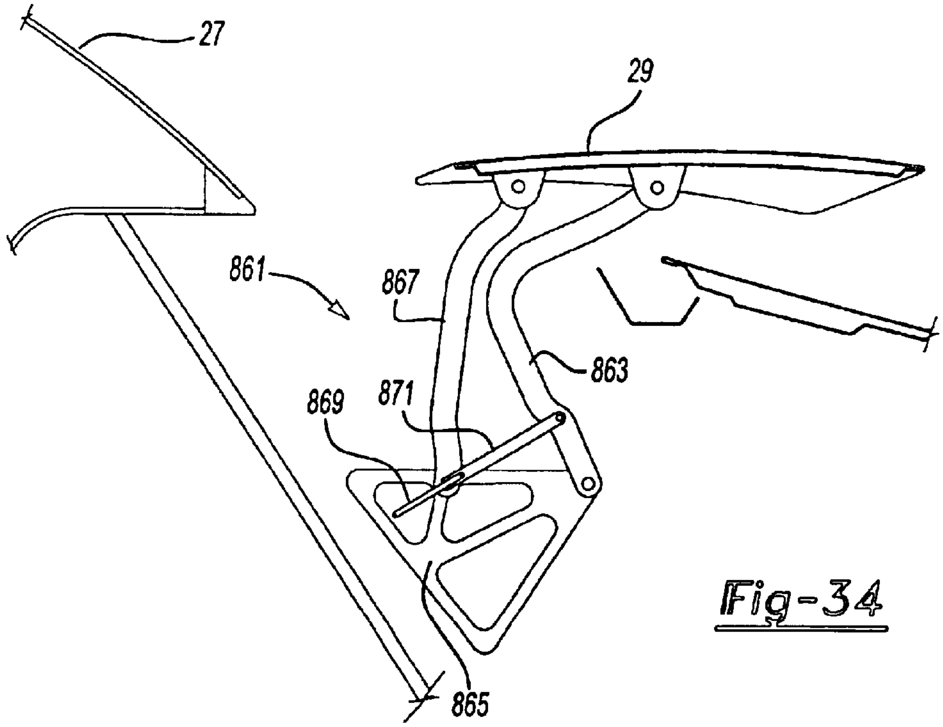

With reference now to FIGS. 18–30, back window 27 is preferably formed in a three-dimensional manner from glass. A metal support frame 51 is encapsulated to the interior surface of back window 27 and is partly visible at the top edge. As seen in FIG. 10, a second electric motor actuator 54 is mounted in roof storage compartment 209. A back window drive cable 55 (FIG. 22) pulls back window 27, located above a secondary track 205. A flexible rubber bulb seal 57 (see FIGS. 23 and 24) is affixed to a lower edge of back window 27 and compresses against a drain trough or sealing surface 621 mounted to an upper and forward position of tonneau cover 29.

Referring now to FIGS. 18–21 and 25–30, a back window coupling mechanism 671 slidably couples back window 27 to secondary track 205. Back window coupling mechanism 671 includes a main drive block 673, a back window carrier 675, a drive link 677, and a follower link 679. Main drive block 673 has an arcuate shaped camming surface 681 defining an internal slot, which engages a cam following pin 684 extending from a proximal end 683 of a drive link 677. A generally middle portion 685 of drive link 677 is rotatably coupled to back window carrier 675 at a pivot 999. A proximal end 687 of follower link 679 is rotatably coupled to a forward section of main drive block 673 at a pivot pin 680. Distal ends 693 and 695 of drive link 677 and follower link 679, respectively, are rotatably and/or slidably attached to brackets 691 attached to the support frame of back window 27. Main drive block 673 and back window carrier 675 are slidable within separated but parallel, undercut grooves 697*a* and 697*b* of secondary track 205.

Referring briefly to FIG. 10, second electric motor actuator 54 includes an electric motor 701 and rotary cable drum 703 and is disposed adjacent to a bottom of secondary track 205 within roof storage compartment 209. A first end 55*a* of back window drive cable 55 is rotatably wound around rotatable cable drum 703 when electric motor 701 rotates the drum in a first direction. An opposite end 55*b* of back window drive cable 55 is pulled around the drum if electric motor 701 is operated in a reverse direction. Pulleys 705 and 707 (FIGS. 10 and 22) located adjacent the ends of secondary track 205 change the pulling direction of back window drive cable 55 in response to energization of the second electric motor actuator 54. The back window cable is externally mounted to the track and has an eyelet that is coupled to and drives main drive block 673 in an advancing or retracting linearly sliding manner relative to secondary track 205. Generally, curved secondary track 205 is mounted to the inside of a quarter panel 207 (FIG. 4) and/or within roof storage compartment 209.

Retraction of main drive block 673 toward roof storage compartment 209 causes camming surface 681 of main drive block 673 to rotate downwardly proximal end 683 of drive link 677 while upwardly and outwardly rotating distal end 693 of drive link 677 away from secondary track 205 and the vehicle. Follower link 679 will rotatably follow in a generally parallel manner thereby lifting back window 27 off the corresponding segment of body seal 63. This movement also serves to raise the bottom of back window 27 off tonneau cover 29. Drive link 677, follower link 679, main drive block 673/back window carrier 675, and back window/frame 27 act as a four-bar linkage assembly.

Figure 19:
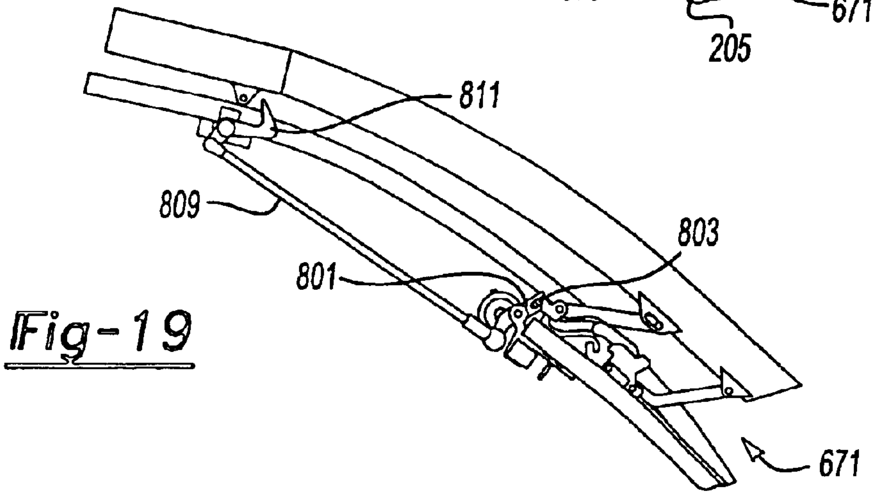
Figure 20:
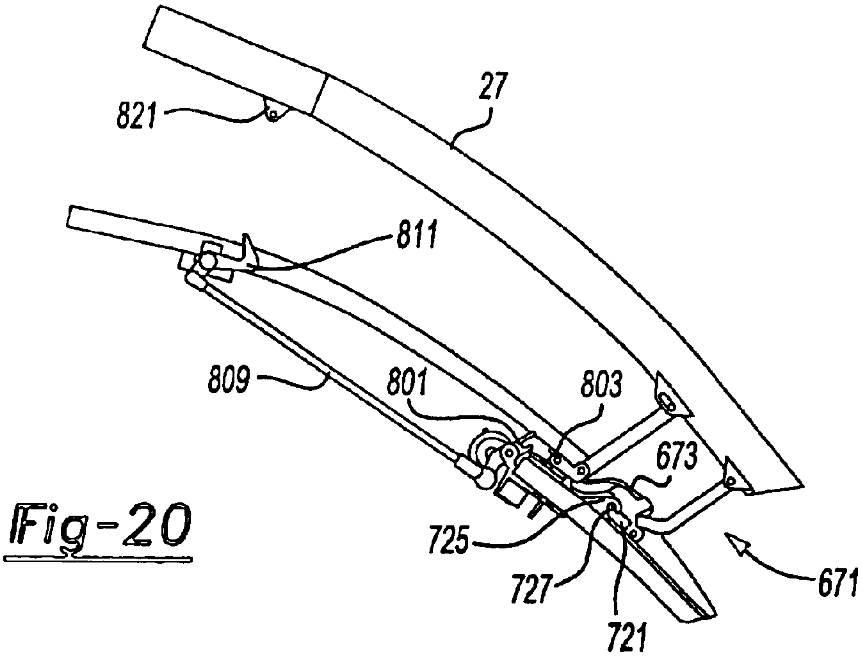
Figure 21:
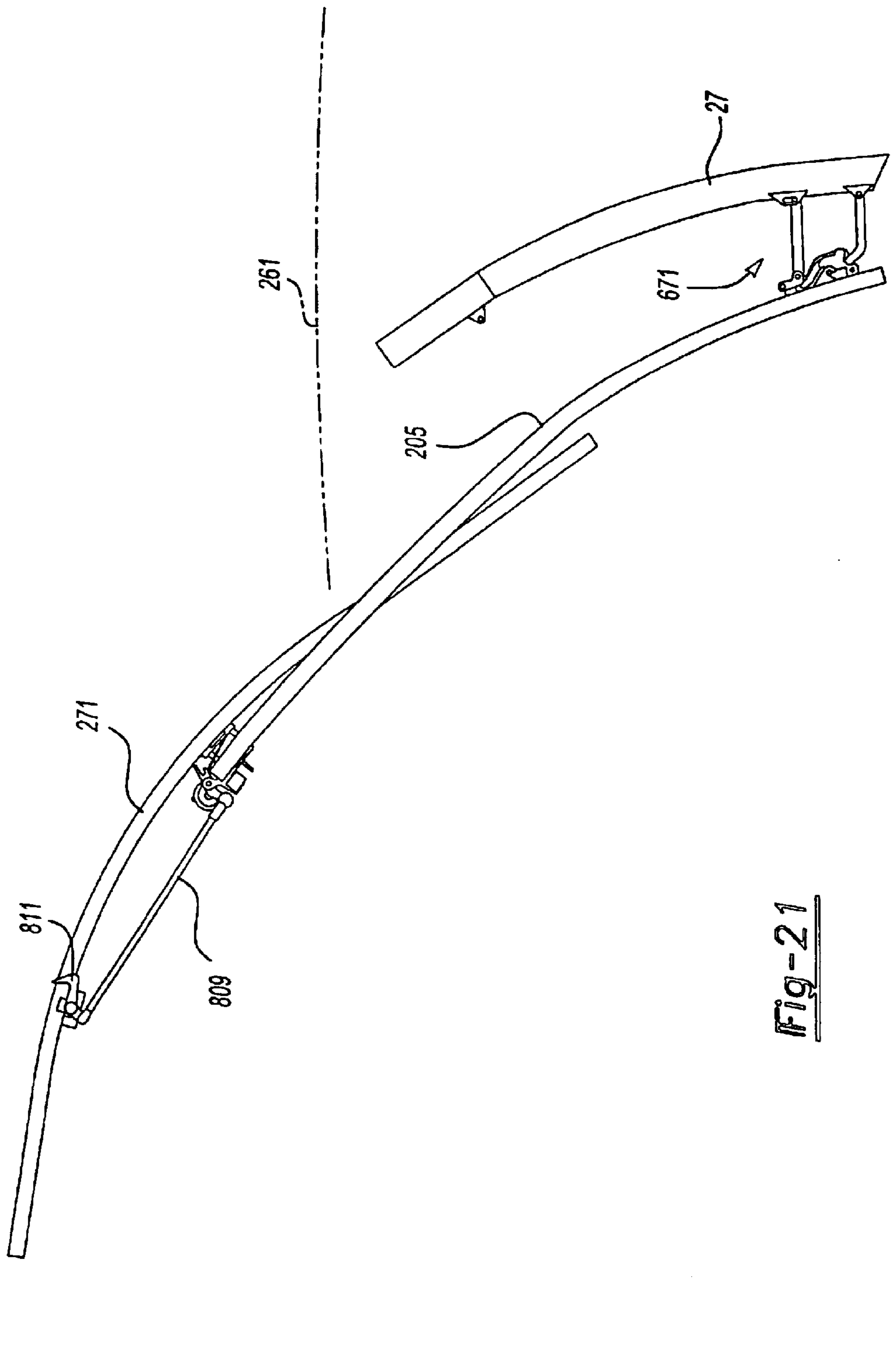

A back window-locking pawl 721 is pivotably coupled to back window carrier 675 at pivot 678. A downwardly projecting foot of back window locking pawl 721 operably engages and abuts against a rectangular aperture in secondary track 205. This serves to maintain the location of back window coupling mechanism 671 until it is desired to fully retract and stow back window 27 into roof storage compartment 209. After back window 27 has been moved to its lifted intermediate position (as shown in FIG. 19), further retracted pulling of back window drive cable 55 by rotary cable drum 703 causes an unlock cam extension 725 projecting from main drive block 673 to slide downwardly along secondary track 205 toward roof storage compartment 209. Unlock cam extension 725 has a generally C-shaped mouth 726 facing in a somewhat rearward and downward direction. A ramp 728 defines a lower portion of C-shaped mouth 726 for unlock cam extension 725. Rearward movement of unlock cam extension 725 causes a transversely extending pin 727 extending from back window locking pawl 721 of back window carrier 675 to ride up ramp 728 of unlock cam extension 725 as shown in FIG. 20. This serves to disengage back window locking pawl 721 from the aperture in secondary track 205, such that back window carrier 675 as well as the remaining back window mechanism and back window 27 can freely slide downward along secondary track 205 into roof storage compartment 209 when second electric motor actuator 54 is energized.

As can be observed in FIGS. 18–21, 29, and 30, a bellcrank 801 has a first end rotatably engagable by a pin 803 mounted to a forward end of main drive block 673. A middle of bellcrank 801 is journalled about a pivot 805 coupled to a support bracket 807. An opposite end 808 of bellcrank 801 is pivotably coupled to an elongated pull down back window rod 809. The opposite end of back window rod 809 is pivotably coupled to a bottom of a bellcrank latch 811. A middle of bellcrank latch 811 is rotatably coupled to a latch support bracket 813 secured to roof panel track 271. Furthermore, a hook-like end 815 of bellcrank latch 811 is rotated from an engaged position with a striker 821 to a disengaged position in response to movement of main drive block 673, via bellcrank 801 and back window rod 809. Striker 821, including a bracket 823 and a pin 825, downwardly projects from an inside surface of metal support frame 51 or other back window extension panel located adjacent the front and upward edge of back window 27. This serves to compress the leading section of back window/frame 27 against the corresponding sealing segment, and then allow for its release for lifting then full retraction movement.

Referring now to FIGS. 31–34, a tonneau cover drive mechanism 861 for tonneau cover 29 is provided. Tonneau cover drive mechanism 861, as well as most other drive mechanisms discussed herein, are disposed in a mirrored symmetrical fashion on both sides of the vehicle and will only be further described herein for one side. A proximal end 873 of a tonneau drive link 863 is pivotably coupled to a stationary support bracket 865. An opposite distal end 875 of tonneau drive link 863 is pivotably coupled to a bracket affixed to an inside of tonneau cover 29. An electric motor or hydraulic actuator (not shown) is coupled to tonneau drive link 863. A tonneau follower link 867 has a distal end 877 pivotably coupled to the tonneau cover bracket and has an opposite proximal end 879 pivotably slidable along a stationary tonneau track 869. Proximal end 879 of tonneau follower link 867 also is pivotably coupled to a drag link 871 that has its opposite end pivotably coupled to tonneau drive link 863. This provides a six-bar linkage mechanism with a sliding track control. This construction allows some initial vertical movement to disengage the adjacent sealing section and then moves rigid tonneau cover 29 along a generally horizontal plane between the closed position shown in FIG. 31 to the fully open position shown in FIG. 34. When in the fully open position, the tonneau cover allows for advancing and retracting access of the back window, mid roof panel, and front roof panel into and out of the roof storage compartment.

The general operation is as follows. An electronic control unit, such as a microprocessor, will first energize electric motor 701 to cause back window coupling mechanism 671 to raise back window 27. Next, the electronic control unit energizes the tonneau actuation that drives tonneau cover drive mechanism 861 to rearwardly slide and open tonneau cover 29. The geometry of tonneau drive link 863 and sliding tonneau follower link 867 causes tonneau cover 29 to move in a slightly vertical but mostly horizontal direction, with minimal angular tipping of tonneau cover 29 (FIGS. 31–34). Tonneau cover 29 is in an overlapping orientation relative to deck lid 43 when open. The open position of tonneau cover 29 allows back window 27 and movable roof panels 23, 25 to be retracted from their closed positions covering passenger compartment 33, to their stowed and open positions within roof storage compartment 209, which is below a beltline or generally horizontal deck lid plane 261. For purposes of this disclosure, the beltline is defined generally as the intersection where the windows of the vehicle meet the painted body. Accordingly, tonneau cover 29 opening and closing movement as well as back window 27 intermediate movement allows for unsealing of each seal, especially compared to a conventional rigid tonneau cover that pivots to a generally vertical orientation.

Figure 35:
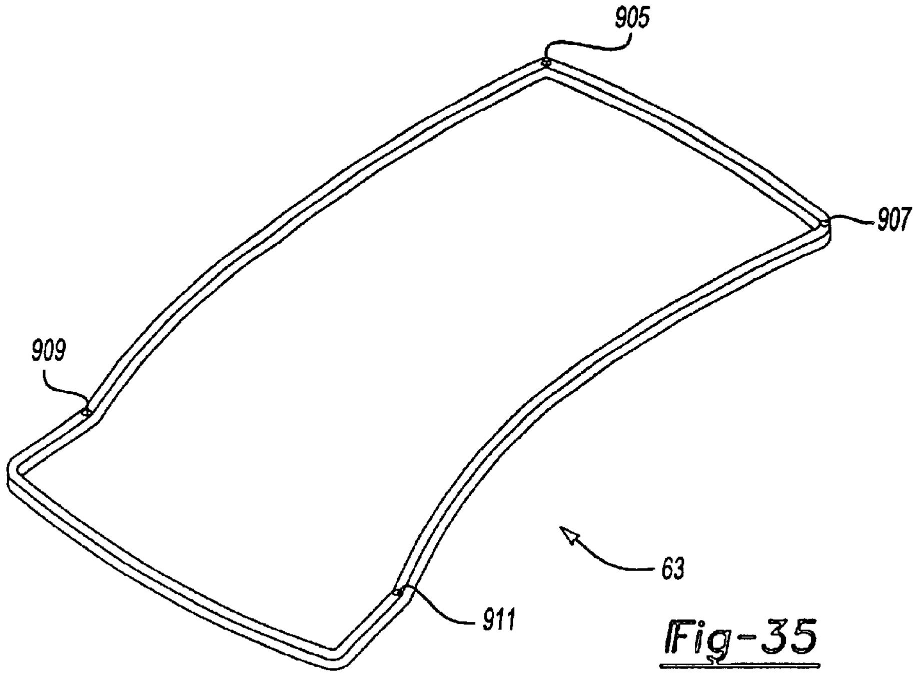
FIG. 35 is a perspective view illustrating the weather sealing arrangement for the vehicle body-to-open air system interface, employed with the preferred embodiment open air system.
Figure 36:
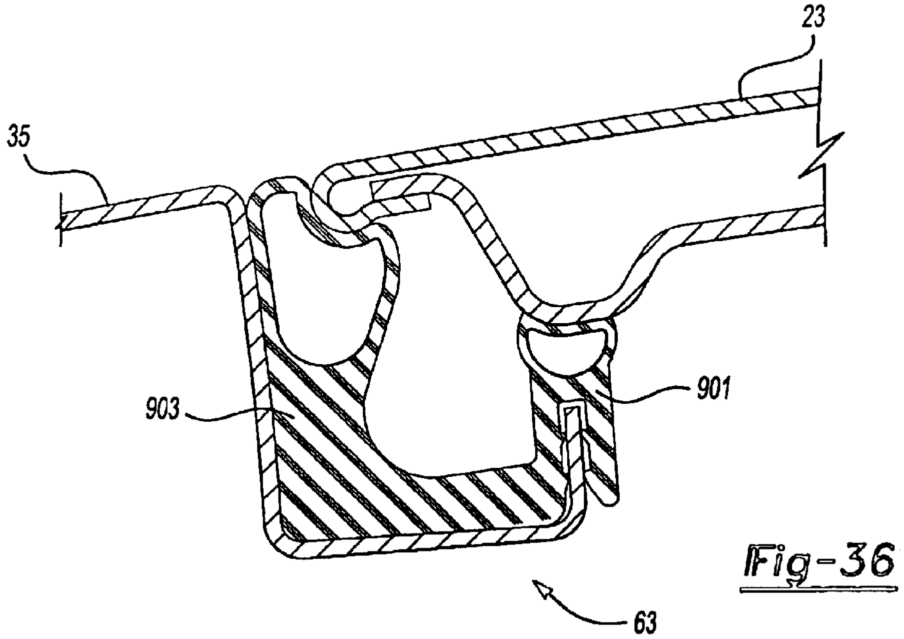
FIG. 36 is a cross sectional view taken along the centerline illustrating the body weather seal at the front header panel-to-front sunroof panel interface employed with the preferred embodiment open air system.
Figure 37:
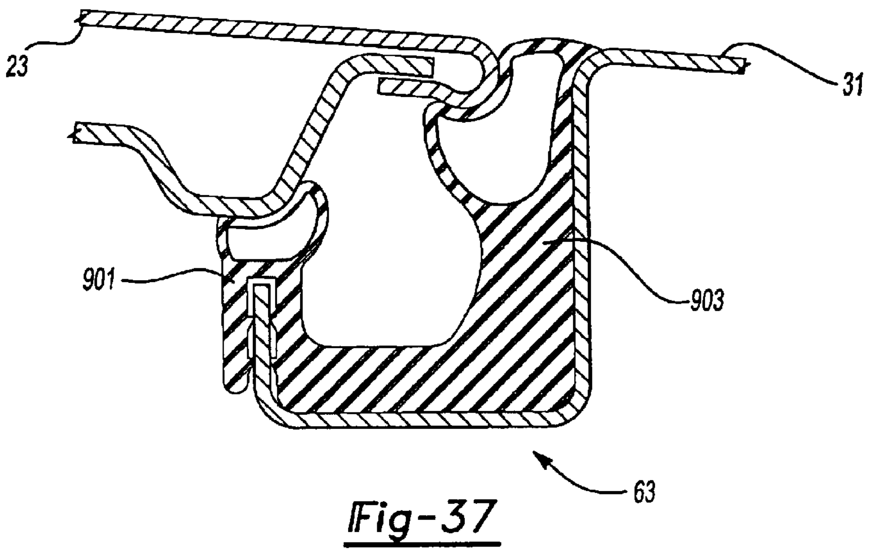
FIG. 37 is a cross sectional view, transversely taken along a side rail section, illustrating the body weather seal at the side rail-to-front sunroof panel interface, with the front sunroof panel disposed in an fully closed position, employed with the preferred embodiment open air system.

As shown in FIGS. 35–37, a single or integrated, one-piece, body seal 63 extends in a continuous manner transversely across the front header 35, longitudinally along both side roof rails 31, longitudinally along C-pillars 39 adjacent roof storage compartment 206, and transversely across the rear structural beam adjacent a rear edge of roof storage compartment 206. Body seal 63 has a generally U-shape with a first upstanding leg 901 surrounding an upstanding flange of the side rail roof gutter, and a second and longer upstanding leg 903 outwardly positioned therefrom. A hollow and compressible bulb is located on each upstanding leg 901, 903. Molded drain pockets 905, 907, 909, and 911 are attached to the weather seal adjacent the front corners and at the transitions between side roof rails 31 and storage compartment 206. Drain tubes are connected to pockets 905 and 907. The water flowing at the rear drains into the body water trough surrounding the vehicle decklid. Thus, the front and side edges of front roof panel 23 compressibly seal against the body seal 63 when fully closed. Furthermore, the side edges of mid roof panel 25 compressibly seal against body seal 63 when in its closed position. The side edges of back window/frame 27 also compressibly seal against body seal 63 when back window 27 is in its fully closed position. Finally, the side and rear edges of tonneau cover 29 will compressibly seal against body seal 63, when tonneau cover 29 is in its fully closed position. Body seal 63 is an extruded rubber or elastomeric polymer member of generally constant cross section. That is, a portion of body seal 63 extending along the header and side rails may be formed from an identical extrusion. Furthermore, this seal may also be used along the tonneau cover.

Figure 38:
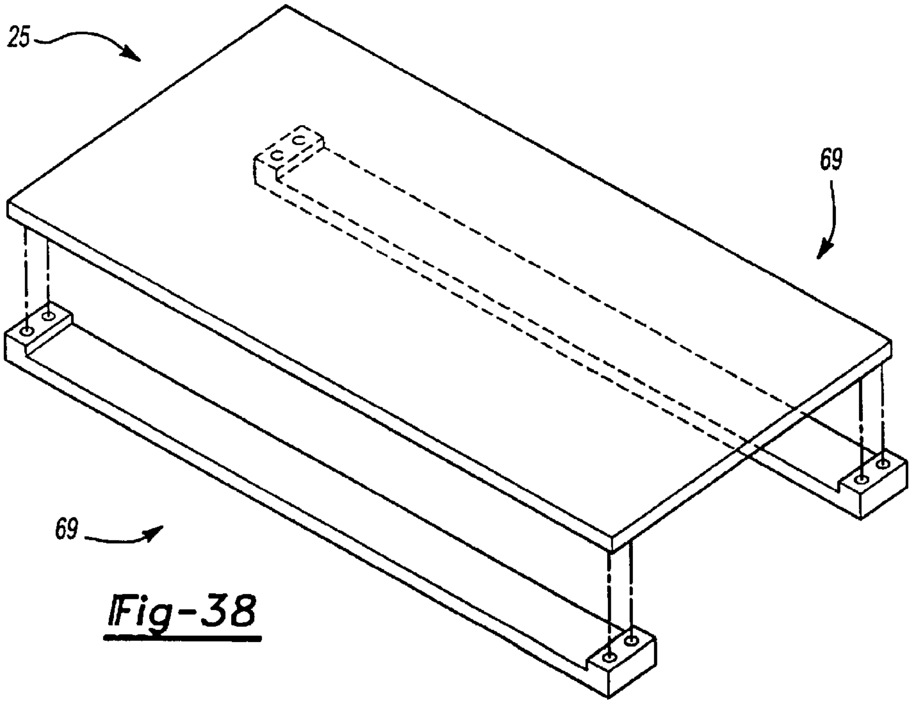
FIG. 38 is an exploded perspective view illustrating the seal carrier arrangement for the rear sunroof panel employed in with the preferred embodiment open air system.
Figure 39:
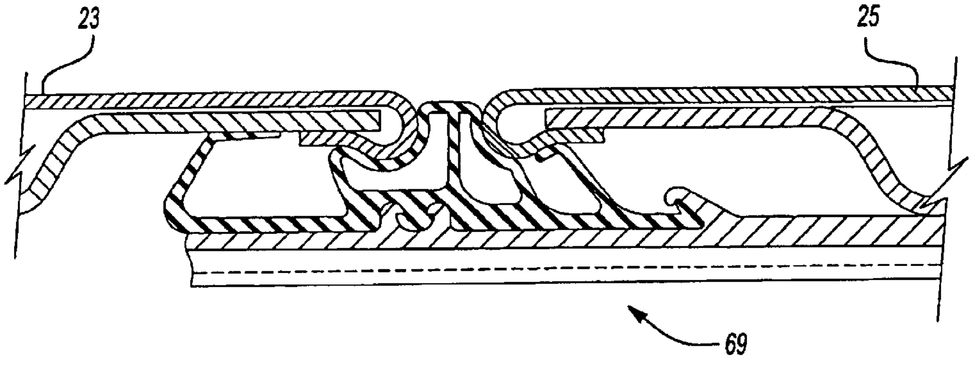
FIG. 39 is a centerline cross sectional view illustrating the sealing arrangement at the front sunroof panel-to-rear sunroof panel interface, employed with the preferred embodiment open air system, when the front and rear sunroof panels are both disposed in their fully closed positions.
Figure 40:
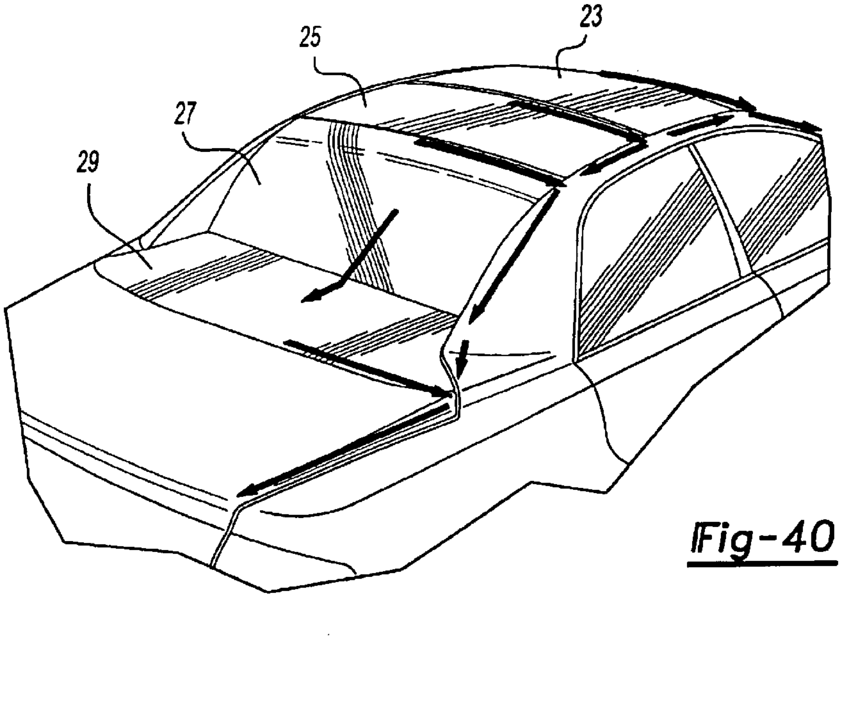
FIG. 40 is a fragmentary perspective view like that of FIG. 1 illustrating a water flow path for the sealing arrangement.

As illustrated in FIGS. 38 and 39, mid roof panel 25 has a leading depressed drain trough and a trailing depressed drain trough, which both extend in a crosscar manner. The leading depressed drain trough is separate from the trailing depressed drain trough. A transverse seal 69 is mounted on peripheral flanges of these drain troughs for abutting against interior surfaces of the corresponding front roof panel 23 and back window 27. Accordingly, water flow is directed as illustrated in FIG. 40. Molded end details transition water to the body drain troughs in body seal 63. It should be noted that a similar sealing arrangement may be used between mid roof panel 25 and back window 27, wherein the seal is mounted to mid roof panel 25.

While the preferred embodiment of the open air system for an automotive vehicle has been disclosed herein, it should be appreciated that other embodiments may be employed without departing from the present invention. For example, the preferred body-colored, metal roof panels may be replaced by generally transparent glass roof panels. In addition, the mid roof panel can be supplied with a tilting and moving mechanism like that employed for the front roof panel to allow for independent venting and retraction. Additional sunroof panels can be provided. Moreover, it is alternately envisioned that scissor driving mechanisms and other camming and linkage arrangements can be employed to tilt or slide the front roof panel, mid roof panel or back window relative to the stationary fixed tracks. Several of the electric motors may also be combined functionally together or replaced by hydraulic or other actuating devices. A further alternate construction uses the deck lid or package shelf as a tonneau cover substitute as long as the desired functions are achieved. The tonneau cover system, sealing arrangement and backlite mechanism can be used with a conventional convertible soft top or hard top roof, and the roof panel mechanisms can be employed with otherwise conventional sunroofs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle roof system for a vehicle, the automotive vehicle roof system comprising:

a roof panel slidably mountable to the vehicle, the roof panel being slidable from a closed position to an opened position;

a back window slidably mountable to the vehicle, the back window being movable from a closed and functional position to a stowed position;

a mechanism operably connectable between the back window and the vehicle, the mechanism being capable of pivoting a top portion of the back window outwardly and subsequently sliding the back window into the stowed position;

a retaining member positionable in a locked position engageable with a pin member extending from the back window and an unlocked position;

an actuation rod operably coupled at a first end to the retaining member for actuating the retaining member between the locked position and the unlocked position; and a main drive block at least partly coupled to the actuation rod so as to actuate the actuation rod.

2. The automotive vehicle roof system according to claim 1 wherein the mechanism comprises:

at least a pair of pivot links operably connectable between the back window and the vehicle, the pivot links cooperating with the back window and the vehicle to define at least a four bar linkage.

3. The automotive vehicle roof system according to claim 1 wherein the back window is in the stowed position when the roof panel is in the opened position.

4. An automotive vehicle roof system comprising:

an elongated track;

a back window having a first end and an opposing second end;

a first retaining member mounted to the back window generally near the first end of the back window;

a mechanism having at least a four-bar linkage slidably coupling the back window to the elongated track to permit the back window to be moved between a closed and functional position and an opened position;

a second retaining member selectively engaging the first retaining member in a locked position and releasing the first retaining member in an unlocked position; and a rod extending between the mechanism and the second retaining member to actuate the second retaining member between the locked position and the unlocked position in response to movement of the mechanism.

5. The automotive vehicle roof system according to claim 4 wherein the first retaining member is a pin.

6. The automotive vehicle roof system according to claim 4 wherein the second retaining member is a bellcrank hook.

7. The automotive vehicle roof system according to claim 4 wherein the mechanism further comprises:

a carrier member slidably disposed in the elongated track;

a first link pivotably coupled between the carrier member and the back window;

a second link pivotably coupled between the carrier member and the back window; and wherein the carrier member, the first link, the second link, and the back window cooperate to define the at least four bar linkage.

8. The automotive vehicle roof system according to claim 7 wherein the mechanism further comprises:

a bellcrank pivotally connectable to the automotive vehicle, the bellcrank operably coupled on a first end to the rod and cammingly engaging the carrier member on a second end to actuate the rod in response to movement of the carrier member.

9. An automotive vehicle roof system for a vehicle, the automotive vehicle roof comprising:

a roof panel slidably mountable to the vehicle, the roof panel being slidable from a closed position to an open position;

a back window slidably mountable to the vehicle, the back window being movable from a closed and functional position to a stowed position; and a mechanism operably connectable between the back window and the vehicle, the mechanism being capable of pivoting a top portion of the back window outwardly and subsequently sliding the back window into a stowed position, further comprising a double-bulb seal extending along a header and a pair of side rails, the seal operably channeling water from the roof panel and the back window.

10. The automotive vehicle roof system according to claim 9 wherein the mechanism comprises:

at least a pair of pivot links operably connectable between the back window and the vehicle, the pivot links cooperating with the back window and the vehicle to define at least a four bar linkage.

11. An automotive vehicle roof system for a vehicle, the automotive vehicle roof comprising:

a roof panel slidably mountable to the vehicle, the roof panel being slidable from a closed position to an opened position;

a back window slidably mountable to the vehicle, the back window being movable from a closed and functional position to a stowed position; and a mechanism operably connectable between the back window and the vehicle, the mechanism being capable of pivoting a top portion of the back window outwardly and subsequently sliding the back window into the stowed position;

wherein the back window is in the stowed position when the roof panel is in the opened position an elongated track;

the back window having a first end and an opposing second end;

a first retaining member mounted to the back window generally near the first end of the back window;

the mechanism having at least a four bar linkage slidably coupling the back window to the elongated track to permit the back window to be moved between the closed and functional position and the opened position;

a second retaining member selectively engaging the first retaining member in a locked position and releasing the first retaining member in an unlocked position; and a rod extending between the mechanism and the second retaining member to actuate the second retaining member between the locked position and the unlocked position in response to movement of the mechanism.

12. The automotive vehicle roof system according to claim 11 wherein the first retaining member is a pin.

13. The automotive vehicle roof system according to claim 11 wherein the second retaining member is a bellcrank hook.

14. The automotive vehicle roof system according to claim 11 wherein the mechanism further comprises:

a carrier member slidably disposed in the elongated track;

a first link pivotably coupled between the carrier member and the back window; and a second link pivotably coupled between the carrier member and the back window.

15. The automotive vehicle roof system according to claim 11 wherein the mechanism further comprises:

a bellcrank pivotally connectable to the automotive vehicle, the bellcrank operably coupled on a first end to the rod and cammingly engaging the carrier member on a second end to actuate the rod in response to movement of the carrier member.

* * * * *

UNITED STATES PATENT AND TRADEMARK OFFICE

CERTIFICATE OF CORRECTION

PATENT NO. : 6,827,392 B2 Page 1 of 1
DATED : December 7, 2004
INVENTOR(S) : Stephen Doncov et al.

It is certified that error appears in the above-identified patent and that said Letters Patent is hereby corrected as shown below:

Column 3,
Line 50, after “is” insert -- an --.

Column 4,
Line 12, “an” should be -- a --.

Column 11,
Line 28, after “position” insert -- ; --.

Signed and Sealed this

Nineteenth Day of April, 2005

JON W. DUDAS
*Director of the United States Patent and Trademark Office*